United States Patent
Jiang et al.

(10) Patent No.: US 9,178,578 B2
(45) Date of Patent: Nov. 3, 2015

(54) MASTER-SLAVE ARCHITECTURE IN A CLOSED LOOP TRANSMIT DIVERSITY SCHEME

(75) Inventors: Yibo Jiang, San Diego, CA (US); Sharad Deepak Sambhwani, San Diego, CA (US); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 13/346,610

(22) Filed: Jan. 9, 2012

(65) Prior Publication Data

US 2012/0178501 A1    Jul. 12, 2012

Related U.S. Application Data

(60) Provisional application No. 61/431,337, filed on Jan. 10, 2011.

(51) Int. Cl.
*H04M 1/00* (2006.01)
*H04B 7/04* (2006.01)
(Continued)

(52) U.S. Cl.
CPC ............ *H04B 7/0404* (2013.01); *H04B 1/7085* (2013.01); *H04B 7/0634* (2013.01); *H04B 7/0617* (2013.01); *H04B 2001/70724* (2013.01)

(58) Field of Classification Search
CPC . H04W 52/325; H04W 52/267; H04W 52/16; H04W 52/12; H04W 52/146; H04W 52/223; H04W 52/40
USPC .......................................................... 455/561
See application file for complete search history.

(56) References Cited

U.S. PATENT DOCUMENTS 6,078,611 A * 6/2000 La Rosa ............... H04B 1/7117
                                                                  375/147
6,564,062 B1    5/2003 Hunzinger
(Continued)

FOREIGN PATENT DOCUMENTS

EP    2403173 A1    1/2012
JP    2000059269 A    2/2000
(Continued)

OTHER PUBLICATIONS

International Search Report and Written Opinion—PCT/US2012/020812—ISA/EPO—Apr. 4, 2012.
(Continued)

*Primary Examiner* — Ajibola Akinyemi
(74) *Attorney, Agent, or Firm* — Darren M. Simon

(57) ABSTRACT

A base station receiver, a computer program product operable at a base station, and a method operable at a base station receiver, for receiving uplink transmit diversity transmissions utilizing a master/slave scheme at the receiver. One or more tracking loops, such as a searcher task, a time tracking loop, or a frequency tracking loop may be implemented at the base station receiver to determine compensation values, such as finger timings for a rake receiver or frequency compensation values, in accordance with characteristics of a first received pilot channel transmitted utilizing a first precoding weight vector. Here, corresponding compensation values may be derived for the reception of a secondary pilot channel transmitted utilizing an precoding weight vector orthogonal to the first precoding weight vector, simply based on those determined for the first pilot channel.

24 Claims, 8 Drawing Sheets

(51) Int. Cl.
*H04B 1/7085* (2011.01)
*H04B 7/06* (2006.01)
*H04B 1/707* (2011.01)

(56) References Cited

U.S. PATENT DOCUMENTS

| | | | |
|---|---|---|---|
| 7,113,745 | B2 | 9/2006 | Khayrallah |
| 8,369,853 | B1* | 2/2013 | Sarkar et al. ................. 455/436 |
| 2004/0114674 | A1* | 6/2004 | Lotter ............... H04B 1/71075 375/148 |
| 2004/0218559 | A1* | 11/2004 | Kim et al. ..................... 370/318 |
| 2006/0194548 | A1* | 8/2006 | Nagaraj .......................... 455/73 |
| 2007/0098017 | A1* | 5/2007 | Lundby et al. ................ 370/474 |
| 2007/0133476 | A1* | 6/2007 | Li et al. ......................... 370/335 |
| 2007/0253501 | A1 | 11/2007 | Yamaura |
| 2009/0003379 | A1 | 1/2009 | Shao et al. |
| 2009/0296788 | A1 | 12/2009 | Hottinen |
| 2009/0296798 | A1 | 12/2009 | Banna et al. |
| 2011/0019715 | A1* | 1/2011 | Brisebois ............. H04B 7/0626 375/130 |

FOREIGN PATENT DOCUMENTS

| | | |
|---|---|---|
| JP | 2005510173 A | 4/2005 |
| JP | 2007318729 A | 12/2007 |
| WO | 03044989 A1 | 5/2003 |
| WO | 2006082637 A1 | 8/2006 |
| WO | 2009028116 A1 | 3/2009 |
| WO | 2010098078 A1 | 9/2010 |

OTHER PUBLICATIONS

Qualcomm Incorporated: "On the benefits of Uplink Closed Loop Transmit Diversity", 3GPP Draft; R1-104737_0n the Benefits of UL CLTD, 3rd Generation Partnership Project (3GPP), Mobile Competence Centre ; 650, Route Des Lucioles ; F-06921 Sophia-Antipolis Cedex ; France, vol. RAN WGI, no. Madrid, Spain; 20100823, Aug. 17, 2010, XP050449978, [retrieved on Aug. 17, 2010].

Mudumbai, et al., "On the Feasibility of Distributed Beamforming in Wireless Networks," IEEE Transactions on Wireless Communications, May 2007, vol. 6, No. 5, pp. 1754-1763.

* cited by examiner

MASTER-SLAVE ARCHITECTURE IN A CLOSED LOOP TRANSMIT DIVERSITY SCHEME

CROSS-REFERENCE TO RELATED APPLICATIONS

This application claims priority to and the benefit of provisional patent application No. 61/431,337, titled "A MASTER-SLAVE ARCHITECTURE IN A CLOSED LOOP TRANSMIT DIVERSITY SCHEME," filed in the United States Patent and Trademark Office on Jan. 10, 2011, the entire content of which is incorporated herein by reference.

BACKGROUND

1. Field

Aspects of the present disclosure relate generally to wireless communication systems, and more particularly, to a base station receiver for receiving a closed-loop transmit diversity uplink transmission.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out, single-in-multiple-out, or a multiple-in-multiple-out (MIMO) system.

A transmit diversity system employs multiple transmit antennas and multiple receive antennas for data transmission. A transmit diversity channel formed by the transmit and receive antennas may be decomposed into several independent spatial channels. Each of the independent spatial channels corresponds to a dimension. The transmit diversity system can provide improved performance (e.g., higher throughput and/or greater reliability) if the additional dimensionalities created by the multiple transmit and receive antennas are utilized.

Generally, during uplink communications, two aspects may be observed, with the first being related to transmit power, while the second may be related to interference observed at base station. With respect to the first aspect, an access terminal may be limited by a maximum transmit power and as such a limited maximum correlated data transmission rate. With respect to the second aspect, interference caused by other users may limit system capacity.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication operable at a base station. Here, the method includes steps of receiving a transmission having a primary pilot channel and a secondary pilot channel, determining a first compensation value for the primary pilot channel, and deriving a second compensation value for the secondary pilot channel based on the first compensation value determined for the primary pilot channel. Further, the method includes applying the first compensation value and the second compensation value to a receiver for compensating a characteristic of the transmission.

Another aspect of the disclosure provides a base station configured for use in a wireless communication system. The base station includes at least one processor, a memory coupled to the at least one processor, and a receiver coupled to the at least one processor, for receiving a transmission comprising a primary pilot channel and a secondary pilot channel. Here, the at least one processor is configured to determine a first compensation value for the primary pilot channel, to derive a second compensation value for the secondary pilot channel based on the first compensation value determined for the primary pilot channel, and to apply the first compensation value and the second compensation value to the receiver for compensating a characteristic of the transmission.

Another aspect of the disclosure provides a base station configured for use in a wireless communication system. The base station includes means for receiving a transmission comprising a primary pilot channel and a secondary pilot channel, means for determining a first compensation value for the primary pilot channel, means for deriving a second compensation value for the secondary pilot channel based on the first compensation value determined for the primary pilot channel, and means for applying the first compensation value and the second compensation value to a receiver for compensating a characteristic of the transmission.

Another aspect of the disclosure provides a computer program product operable at a base station. The computer program product includes a computer-readable medium having instructions for causing a computer to receive a transmission comprising a primary pilot channel and a secondary pilot channel, instructions for causing a computer to determine a first compensation value for the primary pilot channel, instructions for causing a computer to derive a second compensation value for the secondary pilot channel based on the first compensation value determined for the primary pilot channel, and instructions for causing a computer to apply the first compensation value and the second compensation value to a receiver for compensating a characteristic of the transmission.

These and other aspects of the invention will become more fully understood upon a review of the detailed description, which follows.

DETAILED DESCRIPTION

Figure 1:
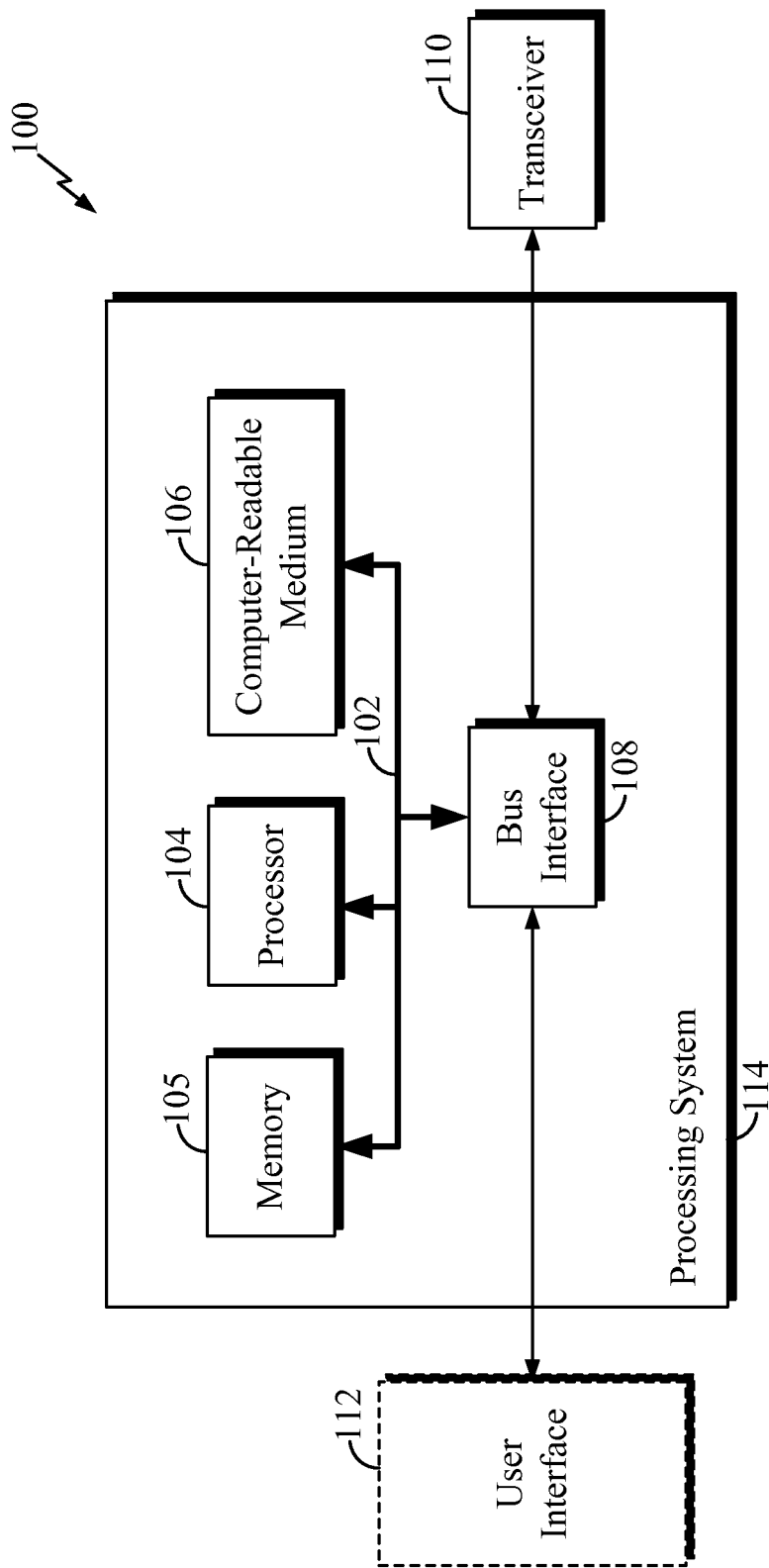
FIG. 1 is a block diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, during communications between devices, closed loop transmit diversity (CLTD) beamforming may be used to improve data rates while using less transmit power. Thus, the CLTD beamforming scheme may allow users to experience increased uplink data rates, and/or reduced transmit power, therefore improving uplink coverage range. In this beamforming scheme, a user equipment (UE) transmitter may apply a precoding (e.g. beamforming) vector over multiple transmit antennas so that the signals from the transmit antennas received at a Node B may be constructively added. Such constructive addition may assist to maximize a Node B receiver signal to noise ratio (SNR), therefore achieve a beamforming effect. Further, in a CLTD scheme with a precoded pilot structure, a suitable receiver architecture is desired because the secondary pilot channel is quite weak. In the CLTD scheme described herein, a master/slave receiver architecture is proposed to address issues related to the weak secondary pilot channel.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

A high speed packet access (HSPA) air interface includes a series of enhancements to the 3G/W-CDMA air interface standardized by the third generation partnership project (3GPP), facilitating greater throughput and reduced latency. Among other modifications over prior releases, HSPA enables the use of hybrid automatic repeat request (HARQ), shared channel transmission, adaptive modulation and coding, and spatial diversity for beamforming and MIMO. The standards that define HSPA include HSDPA (high speed downlink packet access) and HSUPA (high speed uplink packet access, also referred to as enhanced uplink, or EUL).

Spatial diversity may be used to transmit different streams of data simultaneously on the same frequency. The data steams may be transmitted to a single receiving node to increase the data rate or to multiple receiving nodes to increase the overall system capacity. This is achieved by spatially precoding each data stream and then transmitting each spatially precoded stream through a different transmit antenna. The spatially precoded data streams arrive at the receiving node with different spatial signatures, which enables each of the receivers to recover the one or more the data streams destined for that receiver.

Figure 2:
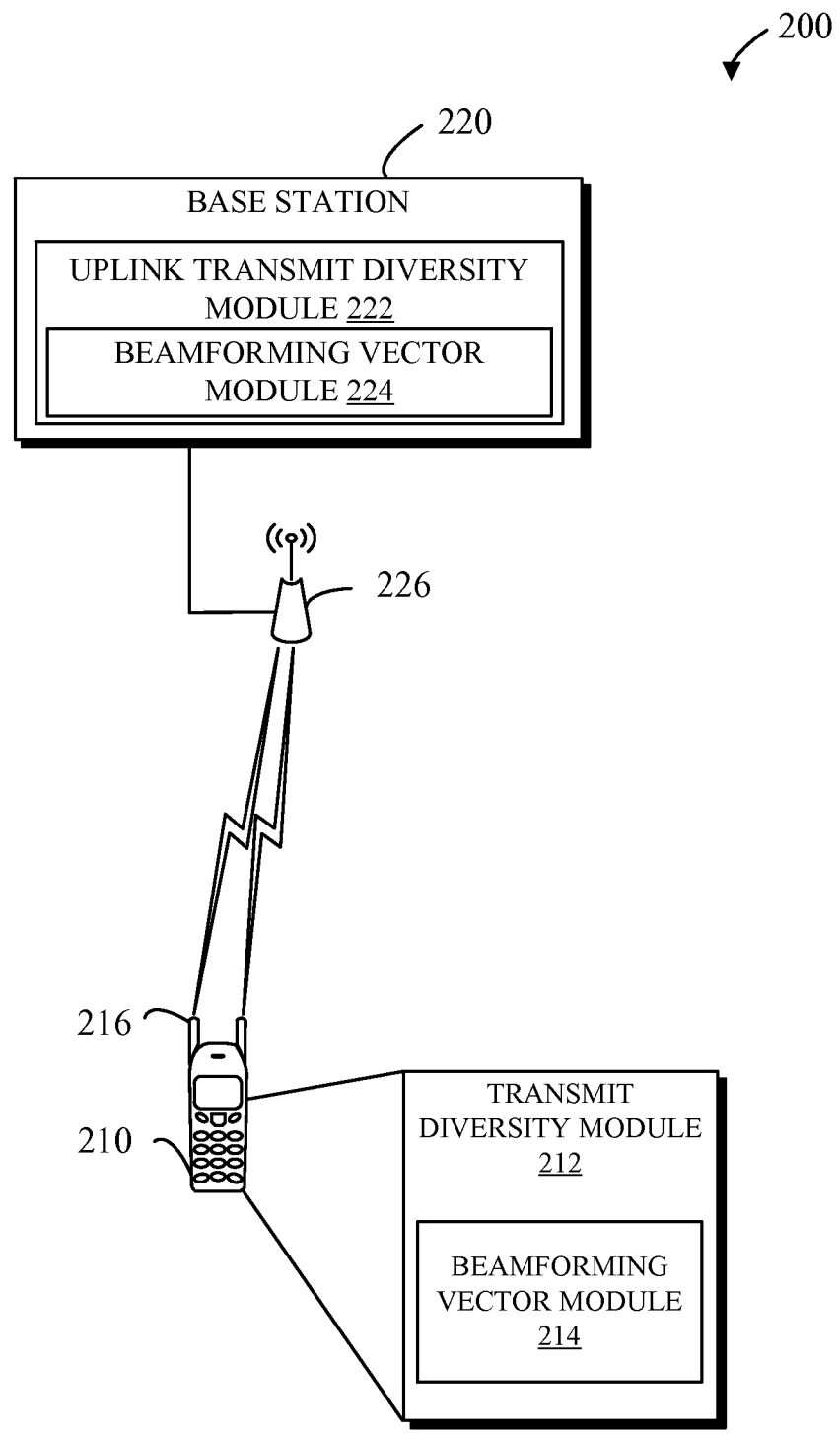
FIG. 2 illustrates a block diagram of a system for structuring and conducting communications in a wireless communication system.

With reference now to FIG. 2, a simplified block diagram showing one example of a wireless communication system 200 for enabling a variant of spatial diversity, called closed loop uplink beamforming transmit diversity, is illustrated. That is, system 200 may include a radio transceiver apparatus 220 serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), an eNode B, or some other suitable terminology. The base station 220 provides a wireless access point to a core network for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device (WCD), a remote device, a mobile subscriber station, an access terminal (AT), a mobile terminal, a wireless terminal, a remote terminal, a handset, a terminal, a user agent, a mobile client, a client, or some other suitable terminology. The downlink (DL), also called the forward link, refers to the communication link from a base station 220 to an access terminal 210, and the uplink (UL), also called the reverse link, refers to the communication link from an access terminal 210 to a base station 220.

Uplink transmit diversity (ULTD) schemes employ more than one transmit antenna (usually two) 216 at the access terminal 210 to improve the uplink transmission performance, e.g., to reduce the access terminal transmit power, or to increase the access terminal coverage range, or to increase the access terminal data rate, or a combination of the above. It can also help improve the overall system capacity. Based on the feedback requirements, ULTD schemes can be categorized into closed-loop (CL) and open-loop (OL) schemes. From the transmitter perspective, ULTD schemes can be classified as beamforming (BF) and antenna switching (AS) schemes.

In general, closed-loop (CL) transmit diversity (TD) schemes require the receiver (in this case, the base station 220) to provide explicit feedback information about the spatial channel to assist the transmitter (here, the access terminal 210) in choosing a transmission format over multiple transmit antennas.

One category of CLTD schemes is the CLTD beamforming scheme, where the base station 220 feeds back to the access terminal 210 a precoding (or beamforming) vector to be used over the multiple transmit antennas 216 so that the signals received at the base station 220 are constructively added. This in turn maximizes the receiver signal to noise ratio (SNR) and achieves the beamforming effect.

Thus, in an aspect of the present disclosure, the access terminal 210 may include a transmit diversity module 212, which may be operable to implement one or more uplink transmit diversity schemes, including but not limited to the CLTD beamforming scheme. Further, transmit diversity module 212 may include a beamforming vector module 214 that may be operable to enable beamforming using one or more received beamforming weight vectors. Still further, the base station 220 may include an uplink transmit diversity module 222, which may be operable to receive and process one or more uplink transmit diversity schemes. Still further, uplink transmit diversity module 222 may include a beamforming vector module 224, which may be operable to generate beamforming weight vectors to send as feedback to the access terminal 210, to provide the feedback corresponding to the closed loop uplink transmit diversity with beamforming.

In one aspect of the system 200, base station 220 may conduct a downlink (DL) communication to access terminal 210 via transceivers and antennas 226. At the access terminal 210, the DL communication may be received via antennas 216 and transceivers. In one aspect of the system 200, the DL communication information may include a beamforming weight vector. In another aspect, access terminal 210 may conduct an uplink (UL) communication to base station 220 via transceivers and antennas 216. At the base station 220, the UL communication may be received via antennas 226 and transceivers. In one aspect of the system 200, information communicated from the access terminal 210 to the base station 220 may be transmitted utilizing the beamforming weight vector.

In any wireless telecommunication system, including system 200, a signal transmitted from a typical omni-directional antenna arrives at a receiver after following multiple different paths. These different paths are generally caused by multiple reflections and diffractions from obstacles such as buildings, geographic terrain, etc. This multipath signal propagation can result in a smearing of the signal energy over time, such that any particular part of the signal may arrive at the receiver at several instants of time. Depending on the wavelength, at certain separations of different instances of the signal, destructive interference can result in signal cancellation, frequently referred to as multipath fading.

In a conventional W-CDMA system, certain countermeasures against the effects of multipath have been implemented. For example, rake receivers may be used, which utilize multiple rake fingers (e.g., correlation receivers) allocated to the delay positions on which significant signal energy arrives. Additionally, fast power control, forward error correction, interleaving, and retransmission protocols can help the receiver recover lost information caused by fading.

For operation of the rake receiver, each of several fingers is assigned to a different multipath component, to be suitably shifted and combined later to recover the information transmitted. Here, the delay positions to which the respective rake fingers are assigned can be identified through the use of certain tracking loops. That is, within each finger or correlation receiver, the fast-changing phase and amplitude values caused by the fast fading process can be tracked, so that the phase-adjusted symbols across the respective fingers can be combined and presented to a decoder for further processing.

In operation, a CLTD beamforming scheme may include the access terminal 210 transmitting multiple pilot channel signals, e.g., including a first pilot channel and a second pilot channel, from multiple antennas 216 to the base station 220. Further, the transmit diversity module 222 associated with the base station 220 may receive the multiple pilot channel transmissions and generate an estimate of uplink channel values based on the received pilot channels. The beamforming vector module 224 may determine phase and/or amplitude values according to the estimated uplink channel values, to improve or maximize a received signal to noise ratio of data and control channels and a primary pilot channel if the primary pilot channel is on the same beam as the data and control channels. Further, the beamforming vector module 224 may generate a beamforming weight vector from the determined values and may transmit the beamforming weight vector to the access terminal 210. In one aspect of the system 200, the beamforming weight vector may be transmitted to the access terminal 210 using a fractional dedicated physical channel (F-DPCH). Still further, the access terminal 210 may receive the beamforming weight vector, and the beamforming vector module 214 may apply the beamforming weight vector information to one or more data channels and one or more control channels. In one aspect, the data channels may include: one or more enhanced dedicated physical data channels (E-DPDCH), one or more R99 dedicated physical data channels (DPDCH), etc. Further, in one aspect, the control channels may include: one or more enhanced dedicated physical control channels (E-DPCCH), etc. Further, one or more pilot channels may be transmitted from the access terminal 210 using one or more dedicated physical control channels (DPCCH).

In the uplink transmit diversity scheme, the respective data and control channels may be allocated among plural virtual antennas, also called precoding or beamforming vectors. That is, one or more of the data and control channels may be transmitted on a first virtual antenna utilizing first beamforming weight vector information, and one or more other ones of the data and control channels may be transmitted on a second virtual antenna utilizing second beamforming weight vector information. In one aspect of the system 200, pilot channel transmissions may be time aligned.

Figure 3:
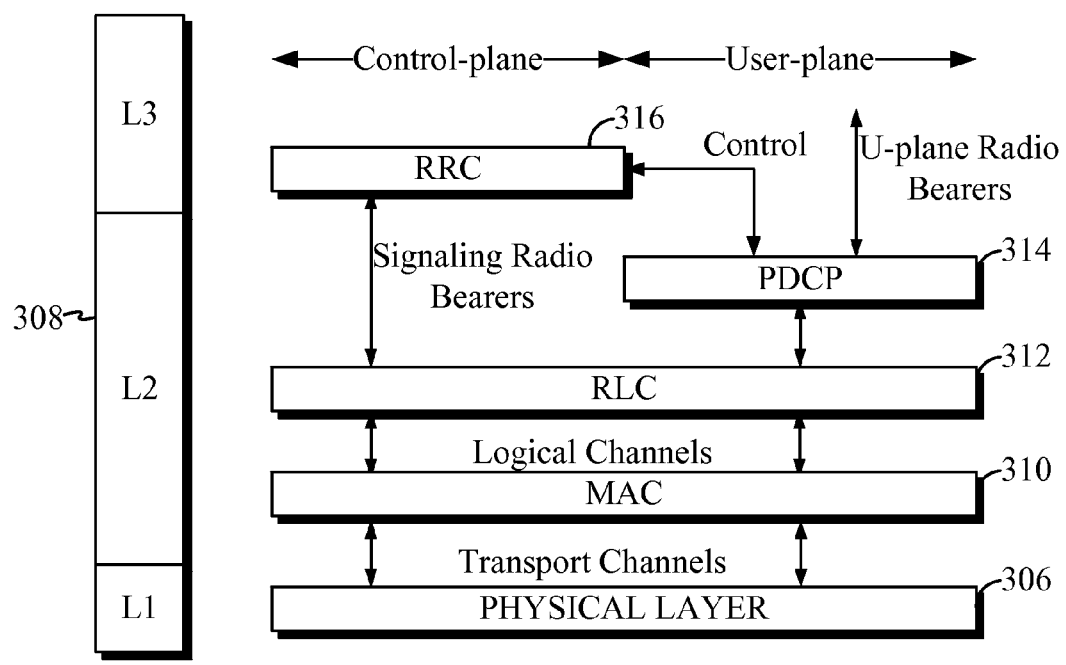
FIG. 3 is a conceptual diagram illustrating an example of a radio protocol architecture for the user and control plane.

In a wireless telecommunication system, the radio protocol architecture between a mobile device such as the access terminal 210 and a cellular network (e.g., through the base station 220) may take on various forms depending on the particular application. An example for a 3GPP HSPA system will now be presented with reference to FIG. 3, illustrating an example of the radio protocol architecture for the user and control planes between the access terminal 210 and the base station 220, commonly referred to as a Node B. Here, the user plane or data plane carries user traffic, while the control plane carries control information, i.e., signaling.

Turning to FIG. 3, the radio protocol architecture for the access terminal 210 and the base station 220 is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 (L2 layer) 308 is above the physical layer 306 and is responsible for the link between the access terminal 210 and the base station 220 over the physical layer 306.

At Layer 3, the RRC layer 316 handles the control plane signaling between the access terminal 210 and the base station 220. RRC layer 316 includes a number of functional entities for routing higher layer messages, handling broadcast and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the access terminal 210 may have several upper layers above the L2 layer 308 including a network layer (e.g., IP layer) that is terminated at a PDN gateway on the network side, and an application layer that may be terminated at the other end of the connection (e.g., far end access terminal, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for access terminals between disparate base stations.

The RLC sublayer 312 provides segmentation and reassembly of upper layer data packets, retransmission of lost data packets, and reordering of data packets to compensate for out-of-order reception due to a hybrid automatic repeat request (HARQ).

The MAC sublayer 310 provides multiplexing between logical and transport channels. The MAC sublayer 310 is also responsible for allocating the various radio resources (e.g., resource blocks) in one cell among the various access terminals. The MAC sublayer 310 is also responsible for HARQ operations.

Figure 4:
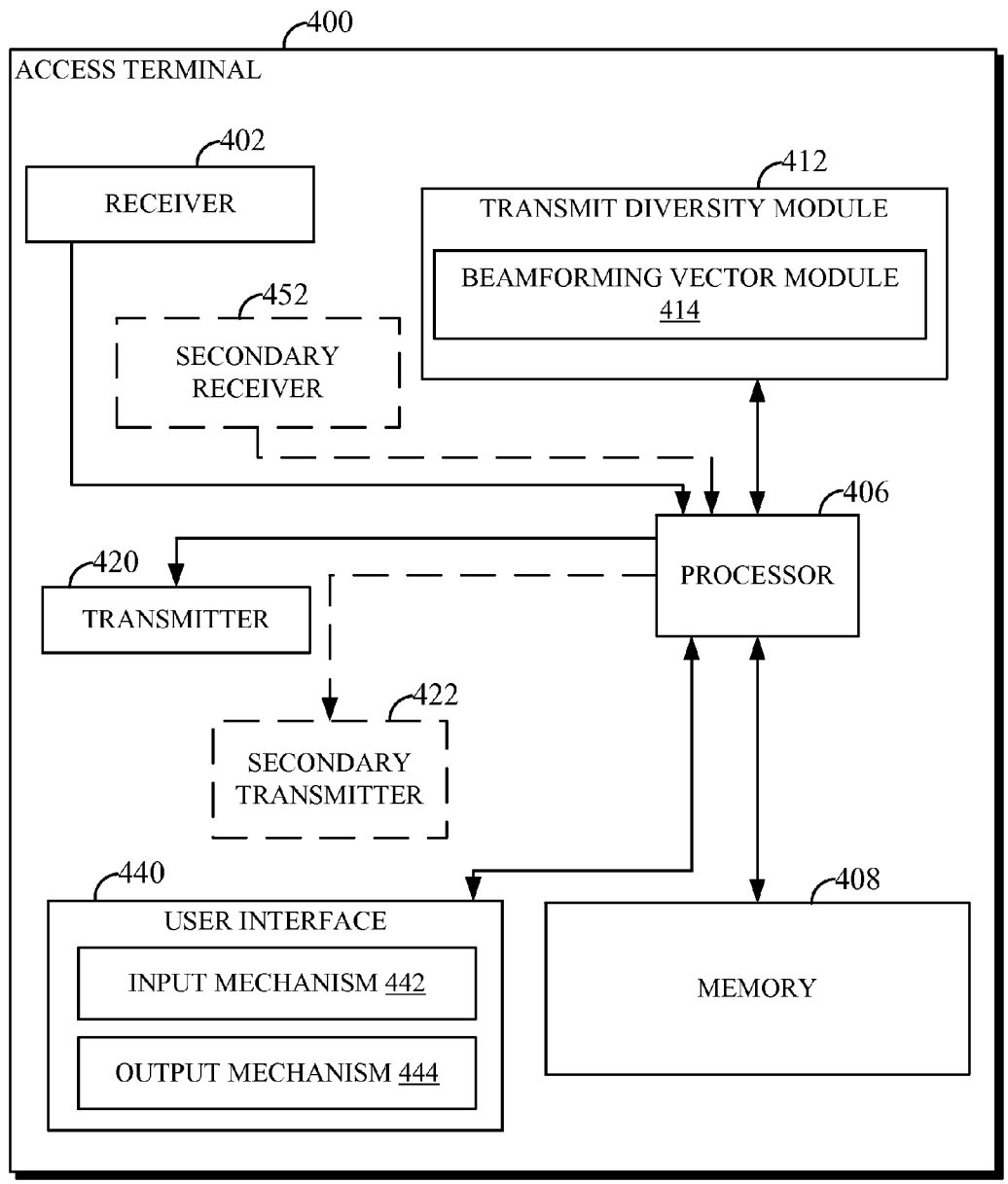
FIG. 4 depicts a simplified block diagram of an exemplary wireless access terminal configured to transmit information utilizing uplink transmit diversity.

With reference now to FIG. 4, a simplified block diagram of an access terminal 400 that enables uplink transmit diversity is presented. In some examples, the access terminal 400 may be the same as the access terminal 210 illustrated in FIG. 2. Access terminal 400 includes a receiver 402 for receiving one or more signals from, for instance, one or more receive antennas (not shown). The receiver 402 may perform typical actions on the received signal such as filter, amplify, downconvert, etc., and may digitize the conditioned signal to obtain samples. The receiver 402 may further include an oscillator for providing a carrier frequency for demodulation of the received signal, and a demodulator for demodulating received symbols and providing them to processor 406 for channel estimation. In one aspect, the access terminal 400 may further include a secondary receiver 452, and may receive additional channels of information.

Processor 406 may be any suitable processor, such as a processor dedicated to analyzing information received by receiver 402 and/or generating information for transmission by one or more transmitters 420 (for ease of illustration, only transmitter 420 and an optional secondary transmitter 422 are shown), a processor that controls one or more components of access terminal 400, and/or a processor that both analyzes information received by receiver 402 and/or receiver 452, generates information for transmission by transmitter 420 for transmission on one or more transmitting antennas (not shown), and controls one or more components of access terminal 400. For example, the processor 406 may be the same as the processing system 114 illustrated in FIG. 1. In one aspect, access terminal 400 may further include a secondary transmitter 422 and may transmit additional channels of information. Access terminal 400 may additionally include a memory 408 coupled to the processor 406 for storing information as needed by the processor 406.

Access terminal 400 may further include a transmit diversity module 412 to enable transmit diversity communications. Here, the transmit diversity module 412 may be the same as the transmit diversity module 212 described above with relation to FIG. 2. Transmit diversity module 412 may further include beamforming vector module 414 to process received beamforming weight vectors and apply beamforming information to at least one of data channels, control channels, or pilot channels.

Additionally, the access terminal 400 may include a user interface 440. User interface 440 may include an input mechanism 442 for generating inputs into the access terminal 400, and an output mechanism 442 for generating information for consumption by the user of the access terminal 400. For example, input mechanism 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, output mechanism 444 may include a display operable to present media content that is in image or video format or an audio speaker to present media content that is in an audio format.

Figure 5:
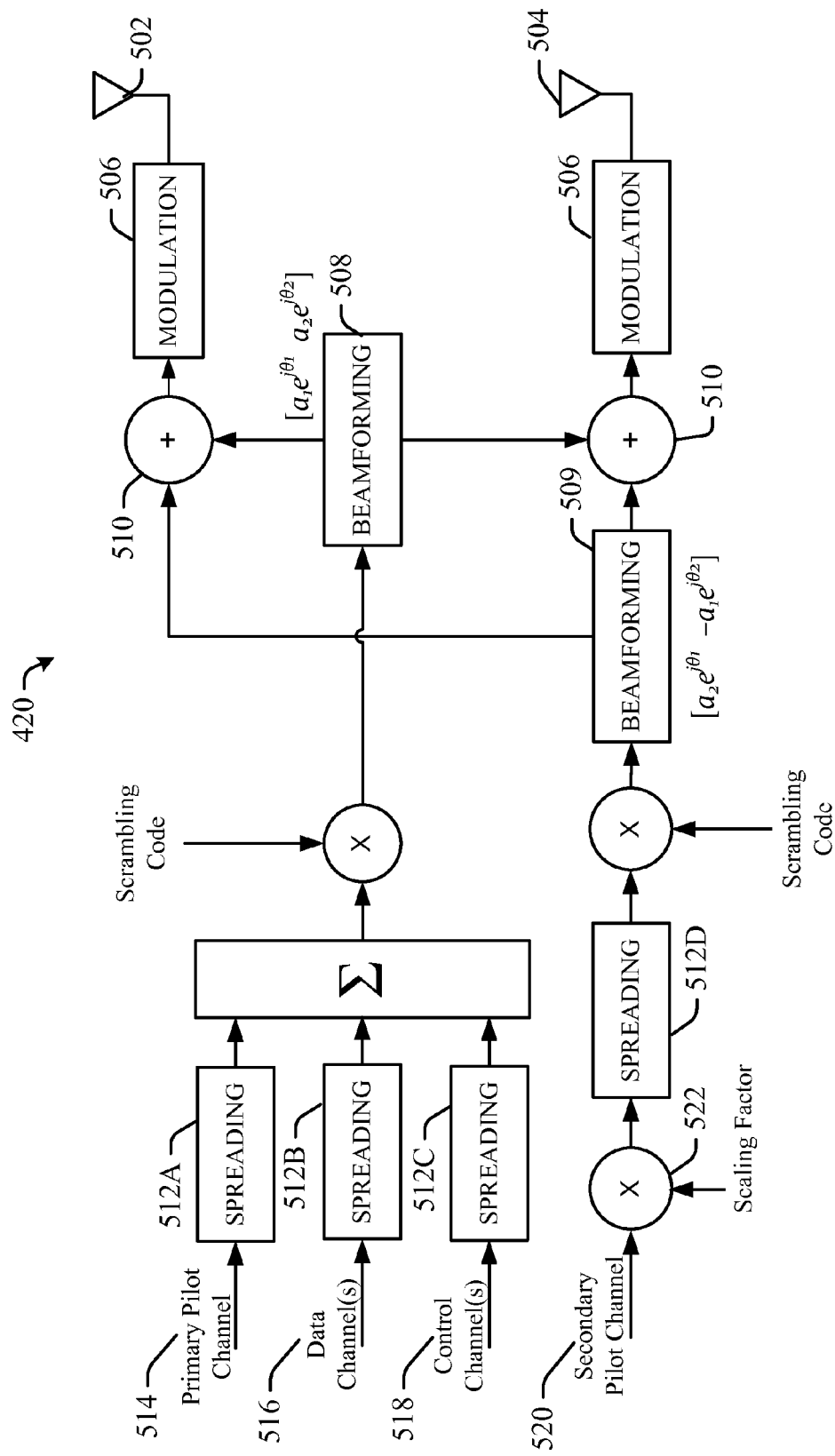
FIG. 5 is a block diagram illustrating additional detail of an exemplary transmitter utilized by the access terminal depicted in FIG. 4.

Turning now to FIG. 5, an exemplary block diagram for a portion of an access terminal 400 for implementing an uplink CLTD scheme with beamforming is illustrated. In the depicted aspect, an exemplary transmitter 420 is illustrated. Here, the transmitter 420 may be the same as the transmitter 420 illustrated in FIG. 4. The transmitter 420 may include a plurality of physical antennas 502 and 504 for transmitting the uplink signal, accessed through respective modulation units Error! Reference source not found.06. The transmitter 420 may further include a plurality of beamforming circuits Error! Reference source not found.08 and 509 operable to apply respective beamforming weight vectors and/or beamforming weight information derived from the corresponding beamforming weight vector.

The beamforming circuits 508 and 509 represent respective virtual antennas, including a dominant virtual antenna represented by the first beamforming circuit 508 and a weaker virtual antenna represented by the second beamforming circuit 509. The virtual antennas may be combined as in the illustrated example utilizing virtual antenna mapping, wherein summing blocks 510 may be utilized to map the virtual antennas to the physical antennas 502 and 504.

Spreading modules 512A-512D may apply respective spreading factors to their corresponding channels, such as a primary pilot channel 514, one or more data channels 516, one or more control channels 518, and secondary pilot channel 520. In one aspect, the primary pilot channel 514 may include a first dedicated physical control channel (DPCCH, 1). Further, in one aspect, the data channels 516 may include one or more enhanced dedicated physical data channels (E-DPDCH), one or more R99 dedicated physical data channel (DPDCH), etc. Further, in one aspect, control channels 518 may include one or more enhanced dedicated physical control channel (E-DPCCH), etc. Still further, in one aspect, the secondary pilot channel 520 may include a second dedicated physical control channel (DPCCH,2).

In a further aspect of the disclosure, a scaling circuit 522 may be applied to the secondary pilot channel 520. Here, to achieve a tradeoff between channel estimation at the base station receiver, and transmit power overhead due to the introduction of the secondary pilot channel, a nonnegative scaling factor a, which may be smaller than one, may be introduced at the scaling circuit 522.

As depicted in FIG. 5, the data channels 516, the control channels 518, and the primary pilot channel 514 may be transmitted on the dominant virtual antenna corresponding to the first beamforming circuit 508, utilizing a first beamforming weight vector that may be signaled by the base station via a downlink control channel. Further, the secondary pilot channel 520 may be transmitted on the weaker virtual antenna corresponding to the second beamforming circuit 509. In this scheme, the data and control channels, e.g., the E-DPDCHs, E-DPCCH, and DPDCH, and the primary pilot channel DPCCH,1 may be transmitted on the dominant virtual antenna, and the secondary pilot channel DPCCH,2 may be transmitted on the weaker virtual antenna. The beamforming weight vector corresponding to one or both of the beamforming circuits 508 and 509 may be signaled by the base station via a downlink control channel.

Mathematically, the dominant virtual antenna corresponding to the first beamforming circuit 508 may be represented by a first beamforming vector:

$$[a_1 e^{j\theta_1}\ a_2 e^{j\theta_2}].$$

In this example, $a_1^2 + a_2^2 = 1$, and the beamforming phase may be denoted by $\theta_{2-\theta_1}$. In one aspect, each of the beamforming phases may be quantized into a finite set, such as $\{0, 90, 180, 270\}$ degrees. Similarly, in another aspect the amplitude variables $[a_1\ a_2]$ may belong to a finite set.

Further, a second beamforming vector associated with the weaker virtual antenna corresponding to the second beamforming circuit 509 may be represented by a second beamforming vector:

$$[a_2 e^{j\theta_1}\ -a_1 e^{j\theta_2}].$$

That is, the second beamforming vector associated with the second beamforming circuit 509 may be orthogonal to the first beamforming vector associated with the first beamforming circuit 508.

In this example, the received signal to noise ratio (SNR) for the secondary pilot channel (DPCCH,2) 520 transmitted utilizing the weaker virtual antenna may be relatively weak at base station. Thus, if the base station receiving the uplink transmission runs a searcher task or time or frequency tracking for the secondary pilot channel 520, the performance may be poor. It would be desirable to implement an approach to address this lack of performance.

Thus, various aspects of the present disclosure provide for a receiver, or for a method operable at a base station for receiving an uplink CLTD transmission that accounts for the relatively weak signal corresponding to the secondary pilot channel 520. That is, it is noted that the secondary pilot channel 520 may be transmitted at the same time as the primary pilot channel 514, and may thereby propagate through essentially the same air channel. Thus, a rake receiver at a base station configured to receive the secondary pilot channel 520 may accordingly have the same finger timings as a rake receiver at the same base station configured to receive the primary pilot channel 514. Further, the respective rake receivers may be assigned the same finger frequency compensations. Thus, the rake receiver for the secondary pilot channel 520 may behave as a slave to its master, that is, the rake receiver for the primary pilot channel 514.

Figure 6:
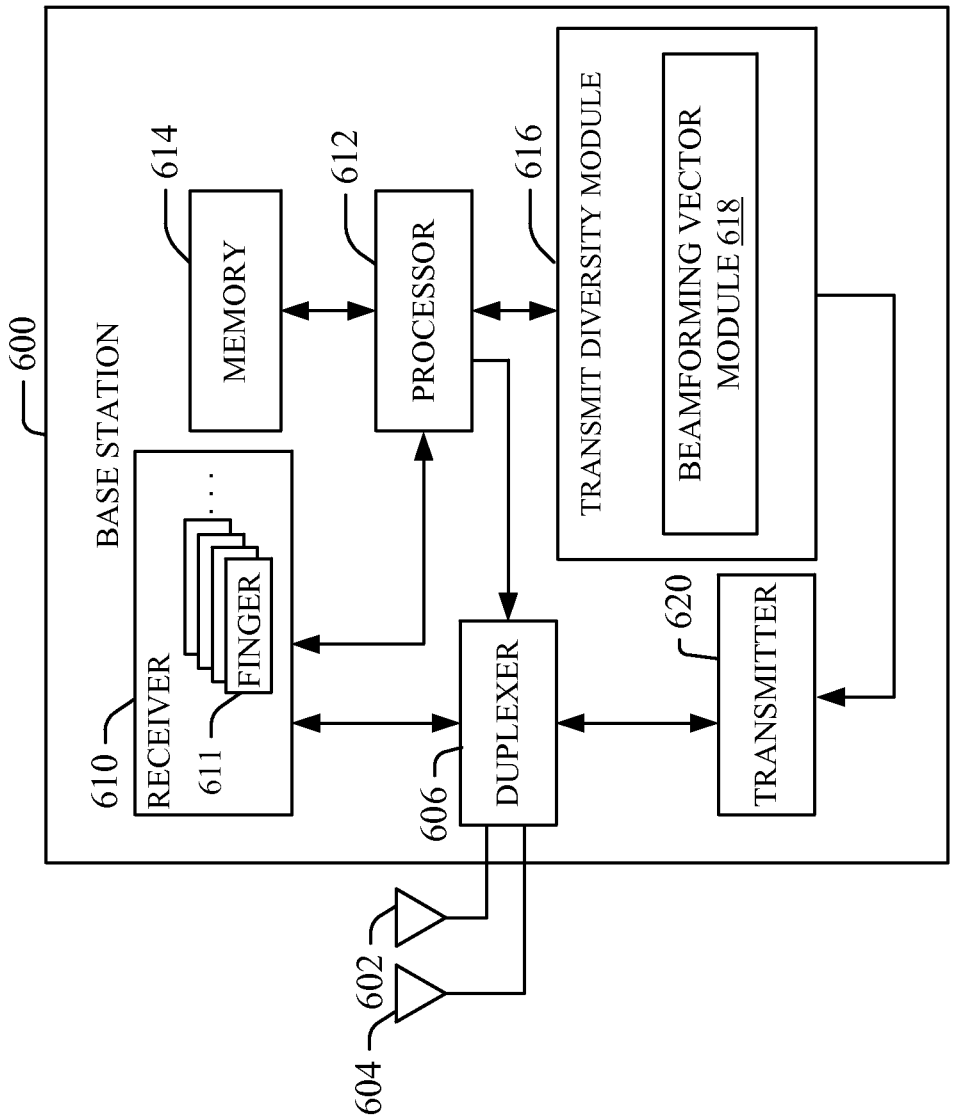
FIG. 6 is a block diagram depicting the architecture of a base station configured to enable one or more beamforming schemes.

FIG. 6 is a simplified block diagram of a base station 600 configured in accordance with some aspects of the present disclosure. Here, the base station 600 may include a receiver 610 for receiving signal(s) from one or more access terminals through a plurality of antennas 602 and 604. The base station 600 may further include a transmitter 620 for transmitting to the one or more access terminals through the plurality of antennas 602 and 604. Switching between the transmitter 620 and the receiver 610 may be performed by a duplexer 606, e.g., controlled by a processor 612. Symbols received at the receiver 610 may be provided to the processor 612. Processor 612 may be any suitable processor, such as a processor dedicated to analyzing information received by receiver 610 and/or generating information for transmission by one or more transmitters 620, a processor that controls one or more components of base station 600, and/or a processor that both analyzes information received by receiver 610, generates information for transmission by transmitter 620 for transmission on one or more antennas 602, 604, and controls one or more components of base station 600. For example, the processor 612 may be the same as the processing system 114 illustrated in FIG. 1.

The processor 612 may further be coupled to a memory 614 for storing information related to wireless data processing. The memory 614 may store data to be transmitted, received data, information related to available channels, data associated with analyzed signal and/or interference strength, information related to an assigned channel, power, rate, or the like, and any other suitable information for estimating a channel and communicating via the channel. The memory 614 may additionally store protocols and/or algorithms associated with estimating and/or utilizing a channel (e.g., performance based, capacity based, etc.).

It will be appreciated that the memory 614 described herein can be volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), and direct Rambus RAM (DRRAM). Memory 408 of the subject systems and methods is intended to include, without being limited to, these and any other suitable types of memory.

Processor 612 may further be coupled to a transmit diversity module 616 for processing signals received from one or more transmit diversity enabled access terminals. In one aspect, transmit diversity module 616 may process multiple received pilot channels from an access terminal. Here, transmit diversity module 616 may further include a beamforming vector module 618 operable for determining phase and/or amplitude values, from the estimated uplink channel values, to improve or maximize a received signal to noise ratio of uplink transmissions. Further, beamforming vector module 618 may generate a beamforming weight vector from the determined values, and may transmit the beamforming weight vector to the access terminal. In one aspect, the beamforming weight vector may be transmitted using a fractional dedicated physical channel (F-DPCH). Signals may be multiplexed and/or prepared for transmission by a transmitter 620 through one or more antennas 602, 604 to the access terminal.

In an aspect of the disclosure, receiver 610 may be a rake receiver configured to receive the beamformed uplink transmission. Here, the rake receiver may be configured to include a plurality of fingers 611, enabling the combining of the signal energy received after traversing different spatial paths. The fingers 611, or correlators, generally are configured to be multiplied with respective time-shifted versions of a locally generated code sequence. In this fashion, each finger 611 largely filters out signals other than a particular signal coming in over a particular path. Thus, multiple ones of the fingers 611 may be assigned respective time delays such that each of the assigned fingers 611 is adapted to detect a portion of the received signal energy corresponding to a particular path.

Assignment of a finger timing may be accomplished in accordance with a searcher task and a time tracking loop. That is, a searcher algorithm may provide for a coarse timing for respective fingers, and a time tracking loop may provide a fine timing for the respective fingers. For each of the searcher task and the time tracking loop, an algorithm may be utilized to determine a suitable timing for one or more of the fingers 611 corresponding to one or more of the signal paths. Here, the searcher task and the time tracking loop may utilize the signal energy corresponding to a particular received channel. That is, the incoming uplink transmission generally includes the primary pilot channel 514, one or more data channels 516, one or more control channels 518, and the secondary pilot channel 520. As described above, with the CLTD scheme as illustrated in FIG. 5, the primary virtual antenna corresponding to the first beamforming circuit 508 is the stronger virtual antenna, and the secondary virtual antenna corresponding to the second beamforming circuit 509 is the weaker virtual antenna. Thus, the received signal energy corresponding to the secondary pilot channel 520, provided on the weaker virtual antenna, may be very low, and the secondary pilot channel 520 may essentially appear to be mere noise. For this reason, the running of a searcher task or a time tracking loop on the secondary pilot channel 520 may prove difficult, and the accuracy may be low.

Further, there may be variations in the frequency of the received signal energy. For example, due to properties of the air channel, or due to inaccuracies in the oscillator frequency at one or both of the transmitter 420 at the access terminal or the receiver 610 at the base station, the frequency of the received signal may not automatically match the expected frequency at the receiver 610. Thus, a frequency tracking loop may be utilized at the receiver 610 to match the receiver frequency with the frequency of the received uplink transmission. Again, because the secondary pilot channel 520 may be weak, the running of the frequency tracking loop on the secondary pilot channel 520 may result in low accuracy and poor performance.

Thus, in accordance with an aspect of the present disclosure, the receiver 610 may be configured to run one or more of a searcher task, a time tracking loop, or a frequency tracking loop based on the primary pilot channel 514, and to derive compensation values for compensating a characteristic of the transmission, such as, for example, by deriving finger timings or frequency compensation values for the secondary pilot channel 520, in accordance with the finger timings and frequency compensation values determined for the primary pilot channel 514. That is, the receiver 610 may be adapted to perform a conventional configuration of finger timings and frequency compensation values, as known to those of ordinary skill in the art, according to a channel transmitted on a first precoding vector. However, rather than performing a configuration of finger timings and frequency compensation values according to a channel transmitted on a second precoding vector, in accordance with an aspect of the present disclosure the finger timings and frequency compensation values corresponding to the channel transmitted on the second precoding vector may instead by derived based on the corresponding values for the channel transmitted on the primary precoding vector. For example, as a finger timing or frequency compensation value is determined and assigned corresponding to the channel transmitted on the first precoding vector, the same or a corresponding value may be assigned corresponding to the channel transmitted on the second precoding vector. Similarly, as a finger timing or frequency compensation value is de-assigned corresponding to the channel transmitted on the first precoding vector, the same or a corresponding value may be de-assigned corresponding to the channel transmitted on the second precoding vector.

Figure 7:
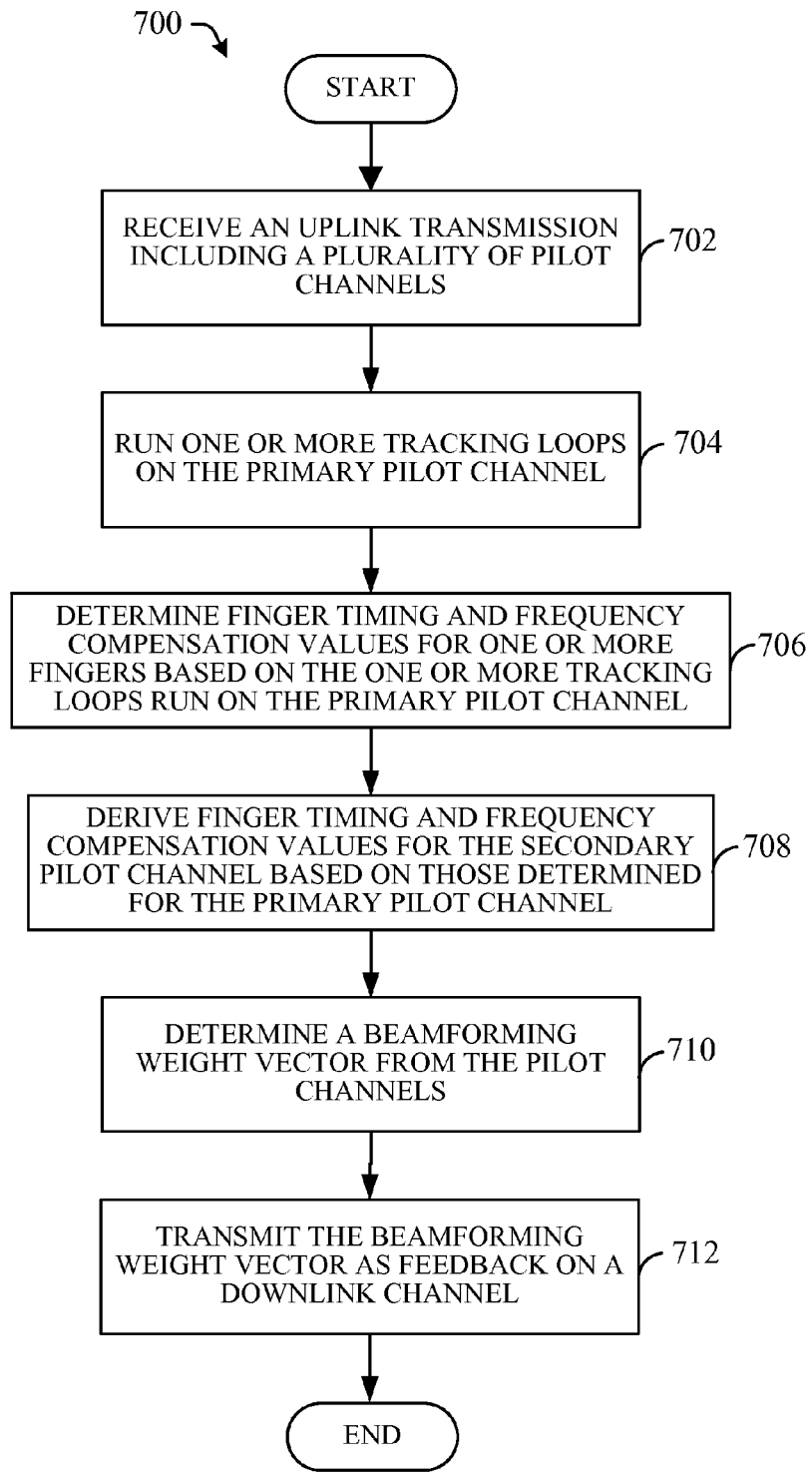
FIG. 7 is a flow chart illustrating an exemplary process for receiving an uplink beamforming transmit diversity transmission.

FIG. 7 is a flow chart illustrating an exemplary process 700 for receiving an uplink transmission in accordance with some aspects of the present disclosure. In some examples, the process 700 may be implemented by a base station 600 as illustrated in FIG. 6. In some examples, the process 700 may be implemented by a processing system 114 as illustrated in FIG. 1. In some examples, the process 700 may be implemented by any suitable receiver for receiving wireless transmissions. In the description that follows, for convenience the base station 600 illustrated in FIG. 6 is described, however, those of ordinary skill in the art will comprehend that this is merely for descriptive purposes.

In block 702, the receiver 610 at the base station 600 may receive an uplink transmission that includes a plurality of pilot channels. For example, the uplink transmission may be transmitted by an access terminal 400 configured for uplink transmit diversity, e.g., utilizing a transmitter 420 configured for CLTD transmission utilizing beamforming. Of course, some aspects of the present disclosure may apply to the reception of other transmit diversity schemes in addition to the CLTD beamforming scheme, including but not limited to closed-loop, open-loop, beamforming, switching, MIMO, etc.

In block 704, the receiver 610 may run one or more tracking loops on the primary pilot channel of the uplink transmission received in block 702. Here, a tracking loop may include one or more of a searcher task for coarse time tracking, a time tracking loop for fine time tracking, or a frequency tracking loop for frequency tracking. Based on the one or more tracking loops, in block 706 the receiver 610 may determine at least one of a finger timing value or a frequency compensation value for one or more fingers 611. Here, a conventional algorithm may be utilized to determine the finger timing values and the frequency compensation values based on the received primary pilot channel, and because the details of such an algorithm are known to those of ordinary skill in the art they are not provided in detail herein. However, unlike in the conventional algorithm for a transmit diversity scheme, wherein a second set of tracking loops might be utilized for the secondary pilot channel, in an aspect of the present disclosure, in block 708 the receiver 610 may derive at least one of finger timing or frequency compensation values for the secondary pilot channel, based on those determined for the primary pilot channel in block 706. That is, in an aspect of the present disclosure, the compensation values determined for the primary pilot channel may be exclusively used to derive the compensation values for the secondary pilot channel, independent of any characteristic of the secondary pilot channel.

That is, because the secondary pilot channel may be provided on the weaker virtual antenna, the running of the tracking loop on the secondary pilot channel may be relatively ineffective. However, where the first pilot and the second pilot can be received at the same time, their characteristics may be the same or similar, so the finger timings and frequency compensation values for the second pilot may simply be assigned in accordance with those of the first pilot. Similarly, when the finger timings or frequency compensation values are de-assigned for a finger for the first pilot channel, the corresponding finger timings or frequency compensation values may be de-assigned for the second pilot channel.

In block 710, the processor 612 of the base station 600 may calculate a beamforming weight vector based on the received pilot channels from block 702, and may provide the calculated beamforming weight vector to transmitter 620. That is, when receiving a transmission according to a closed-loop transmit diversity scheme, in block 710 the process may determine a beamforming weight vector from at least one of the received pilot channels. For example, the receiver 610 may communicate with the processor 612 to detect one or more parameters of the uplink channel in accordance with a received pilot channel transmitted utilizing a first precoding vector, and another received pilot channel utilizing a second precoding vector. Based on the detected parameters, the processor 612 may calculate a new beamforming weight vector to be utilized for a future uplink transmission from the access terminal.

Thus, in block 712, the transmitter 620 may transmit the beamforming weight vector to the access terminal 400 as feedback on a downlink channel. As described above, the access terminal 400 may accordingly utilize a first beamforming weight vector for a first beamforming circuit 508, and a second beamforming vector orthogonal to the first beamforming vector for a second beamforming circuit 509. In this example, both the first beamforming weight vector and the second beamforming weight vector may be based on the received beamforming weight vector determined in block 710.

Figure 8:
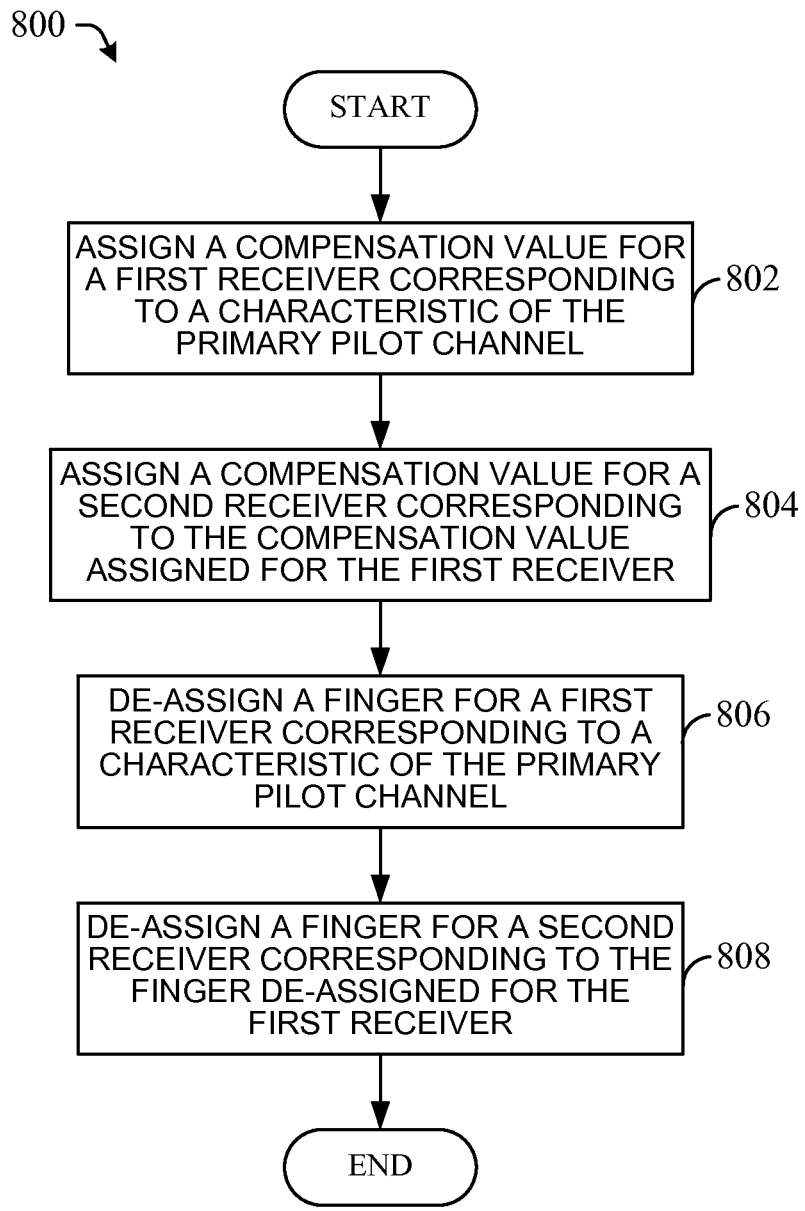
FIG. 8 is a flow chart illustrating additional detail of a master/slave architecture for a receiver.

FIG. 8 is a flow chart illustrating further details of one example of deriving compensation values for a second receiver based on determined compensation values for a first receiver. That is, the process 800 may correspond to a portion of block 708 in FIG. 7 in some aspects of the present disclosure. Here, in block 802, the process may assign a compensation value, such as a finger timing or a frequency compensation value, for a first receiver, corresponding to a characteristic of the received primary pilot channel. In block 804, the process may assign a compensation value for a second receiver, such as a finger timing or a frequency compensation value, corresponding to the compensation value assigned for the first receiver in block 802.

Similarly, in block 806, the process may de-assign a compensation value, such as a finger timing or a frequency compensation value, for a first receiver, corresponding to a characteristic of the received primary pilot channel. In block 808, the process may de-assign a compensation value for the second receiver, such as a finger timing or a frequency compensation value, corresponding to the compensation value de-assigned for the first receiver in block 806. Thus, in accordance with various aspects of the present disclosure, the receiver corresponding to the primary pilot channel is thus treated as a master, and the receiver corresponding to the secondary pilot channel is thus treated as a slave.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA.

Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication operable at a base station, comprising:
   receiving a transmission comprising a primary pilot channel and a secondary pilot channel;
   determining a first finger timing of a rake receiver configured to receive the primary pilot channel;
   deriving a second finger timing of the rake receiver configured to receive the secondary pilot channel exclusively based on the first finger timing, independent of any characteristic of the secondary pilot channel; and
   applying the first finger timing and the second finger timing to the rake receiver of the base station for compensating a characteristic of the transmission.

2. The method of claim 1, wherein the determining of the first finger timing for the primary pilot channel comprises running at least one tracking loop on the primary pilot channel.

3. The method of claim 2, wherein the at least one tracking loop comprises at least one of a searcher, a time tracking loop, or a frequency tracking loop.

4. The method of claim 1, further comprising determining a beamforming weight vector corresponding to the primary pilot channel and the secondary pilot channel.

5. The method of claim 4, further comprising transmitting the beamforming weight vector on a downlink feedback channel.

6. The method of claim 1, further comprising:
   determining a first frequency compensation value of the rake receiver configured to receive the primary pilot channel; and
   deriving a second frequency compensation value of the rake receiver configured to receive the secondary pilot channel based on the first frequency compensation value.

7. A base station configured for use in a wireless communication system, comprising:
   at least one processor;
   a memory coupled to the at least one processor; and
   a rake receiver coupled to the at least one processor, for receiving a transmission comprising a primary pilot channel and a secondary pilot channel,
   wherein the at least one processor is configured to:
      determine a first finger timing of the rake receiver configured to receive the primary pilot channel;
      derive a second finger timing of the rake receiver configured to receive the secondary pilot channel exclusively based on the first finger timing, independent of any characteristic of the secondary pilot channel; and
      apply the first finger timing and the second finger timing to the rake receiver for compensating a characteristic of the transmission.

8. The base station of claim 7, wherein the determining of the first finger timing for the primary pilot channel comprises running at least one tracking loop on the primary pilot channel.

9. The base station of claim 8, wherein the at least one tracking loop comprises at least one of a searcher, a time tracking loop, or a frequency tracking loop.

10. The base station of claim 7, wherein the at least one processor is further configured to determine a beamforming weight vector corresponding to the primary pilot channel and the secondary pilot channel.

11. The base station of claim 10, further comprising a transmitter coupled to the at least one processor, for transmitting the beamforming weight vector on a downlink feedback channel.

12. The base station of claim 7, wherein the at least one processor is further configured to:
   determine a first frequency compensation value of the rake receiver configured to receive the primary pilot channel; and
   derive a second frequency compensation value of the rake receiver configured to receive the secondary pilot channel based on the first frequency compensation value.

13. A base station configured for use in a wireless communication system, comprising:
   means for receiving a transmission comprising a primary pilot channel and a secondary pilot channel;
   means for determining a first finger timing of a rake receiver configured to receive the primary pilot channel;
   means for deriving a second finger timing of the rake receiver configured to receive the secondary pilot channel exclusively based on the first finger timing, independent of any characteristic of the secondary pilot channel; and means for applying the first finger timing and the second finger timing to the rake receiver for compensating a characteristic of the transmission.

14. The base station of claim 13, wherein the means for determining the first finger timing for the primary pilot channel is further configured to run at least one tracking loop on the primary pilot channel.

15. The base station of claim 14, wherein the at least one tracking loop comprises at least one of a searcher, a time tracking loop, or a frequency tracking loop.

16. The base station of claim 13, further comprising means for determining a beamforming weight vector corresponding to the primary pilot channel and the secondary pilot channel.

17. The base station of claim 16, further comprising means for transmitting the beamforming weight vector on a downlink feedback channel.

18. The base station of claim 13, further comprising:
means for determining a first frequency compensation value of the rake receiver configured to receive the primary pilot channel; and
means for deriving a second frequency compensation value of the rake receiver configured to receive the secondary pilot channel based on the first frequency compensation value.

19. A computer program product operable at a base station, comprising:
a non-transitory computer-readable medium comprising:
instructions for causing a computer to receive a transmission comprising a primary pilot channel and a secondary pilot channel;
instructions for causing a computer to determine a first finger timing of a rake receiver configured to receive the primary pilot channel;
instructions for causing a computer to derive a second finger timing of the rake receiver configured to receive the secondary pilot channel exclusively based on the first finger timing, independent of any characteristic of the secondary pilot channel; and
instructions for causing a computer to apply the first finger timing and the second finger timing to the rake receiver for compensating a characteristic of the transmission.

20. The computer program product of claim 19, wherein the instructions for causing a computer to determine the first finger timing for the primary pilot channel further comprise instructions for causing a computer to run at least one tracking loop on the primary pilot channel.

21. The computer program product of claim 20, wherein the at least one tracking loop comprises at least one of a searcher, a time tracking loop, or a frequency tracking loop.

22. The computer program product of claim 19, further comprising instructions for causing a computer to determine a beamforming weight vector corresponding to the primary pilot channel and the secondary pilot channel.

23. The computer program product of claim 22, further comprising instructions for causing a computer to transmit the beamforming weight vector on a downlink feedback channel.

24. The computer program product of claim 19, the computer-readable medium further comprising:
instructions for causing a computer to determine a first frequency compensation value of the rake receiver configured to receive the primary pilot channel; and
instructions for causing a computer to derive a second frequency compensation value of the rake receiver configured to receive the secondary pilot channel based on the first frequency compensation value.

* * * * *